United States Patent [19]
Coughlin

[11] Patent Number: 5,878,386
[45] Date of Patent: Mar. 2, 1999

[54] NATURAL LANGUAGE PARSER WITH DICTIONARY-BASED PART-OF-SPEECH PROBABILITIES

[75] Inventor: Deborah A. Coughlin, Seattle, Wash.

[73] Assignee: Microsoft Corporation, Redmond, Wash.

[21] Appl. No.: 671,940

[22] Filed: Jun. 28, 1996

[51] Int. Cl.$^6$ .................................................. G06F 17/20
[52] U.S. Cl. .............................................. 704/10; 707/532
[58] Field of Search ................................ 704/8, 1, 9, 10; 707/530, 531, 532, 533

[56] References Cited

U.S. PATENT DOCUMENTS

| | | | |
|---|---|---|---|
| 4,868,750 | 9/1989 | Kucera et al. | 704/8 |
| 4,887,212 | 12/1989 | Zamora et al. | 704/8 |
| 5,146,405 | 9/1992 | Church | 704/9 |
| 5,243,520 | 9/1993 | Jacobs et al. | 704/8 |
| 5,331,556 | 7/1994 | Black, Jr. et al. | 364/419.08 |
| 5,541,836 | 7/1996 | Church et al. | 704/7 |
| 5,724,594 | 3/1998 | Tentheroudakis | 704/8 |

FOREIGN PATENT DOCUMENTS

| | | |
|---|---|---|
| 0598597 A1 | 11/1993 | European Pat. Off. . |
| 0598598 A1 | 11/1993 | European Pat. Off. . |
| WO 96/00436 | 1/1996 | WIPO ............................... G10L 5/00 |

OTHER PUBLICATIONS

Stephen D. Richardson, "Bootstrapping Statistical Processing into a Rule–based Natural Language Parser," In Proceedings of the ACL Workshop Combining symbolic and statistical approaches to language, pp. 96–103. Jul. 1994.

Kenneth W. Church "Current Practice in Part of Speech Tagging and Suggestions for the Future" in book edited by Mackie, McAuley, Simmons, For Henry Kucera: Studies in Slavic Philology and Computational Linguistics, Michigan Slavic Publications Ann Arbor 1992, pp. 13–48.

*Primary Examiner*—David R. Hudspeth
*Assistant Examiner*—Patrick N. Edouard
*Attorney, Agent, or Firm*—Lee & Hayes, PLLC

[57] ABSTRACT

A natural language parser determines part-of-speech probabilities by using a dictionary or other lexicon as a source for the part-of-speech probabilities. A machine-readable dictionary is scanned, word-by-word. For each word, the number of senses listed for the word and associated with a part of speech are counted. A part-of-speech probability is then computed for each part of speech based upon the number of senses counted. The part-of-speech probability is indicative of how likely the word is to assume a particular part of speech in a text. The most probable parts of speech are then used by a parser during the first parse of an input string of text to improve the parser's accuracy and efficiency.

48 Claims, 6 Drawing Sheets

NATURAL LANGUAGE PARSER WITH DICTIONARY-BASED PART-OF-SPEECH PROBABILITIES

TECHNICAL FIELD

This invention relates to a system and method for parsing natural language text.

BACKGROUND OF THE INVENTION

A natural language processing system is a computer implemented software system which intelligently derives meaning and context from an input string of natural language text. "Natural languages" are languages which are spoken by humans (e.g., English, French, Japanese). Computers cannot, without assistance, distinguish linguistic characteristics of natural language text. For instance, a sentence in a natural language text read as follows:

I saw a bird.

A student of English understands that, within the context of this sentence, the word "I" is a pronoun, the word "saw" is a verb, the word "a" is an adjective, and the word "bird" is a noun. However, in the context of other sentences, the same words might assume different parts of speech. Consider the following sentence:

Use a saw.

The English student recognizes that the word "use" is a verb, the word "a" is an adjective, and the word "saw" is a noun. Notice that the word "saw" is used in the two sentences as different parts of speech, a verb and a noun, which an English speaking person realizes. To a computer, however, the word "saw" is represented by the same bit stream and hence can be identical for both sentences. The computer is equally likely to consider the word "saw" as a noun as it is a verb, in either sentence. A natural language processing system assists the computer in distinguishing how words are used in different contexts and in applying rules to construct intelligible text.

Figure 1:
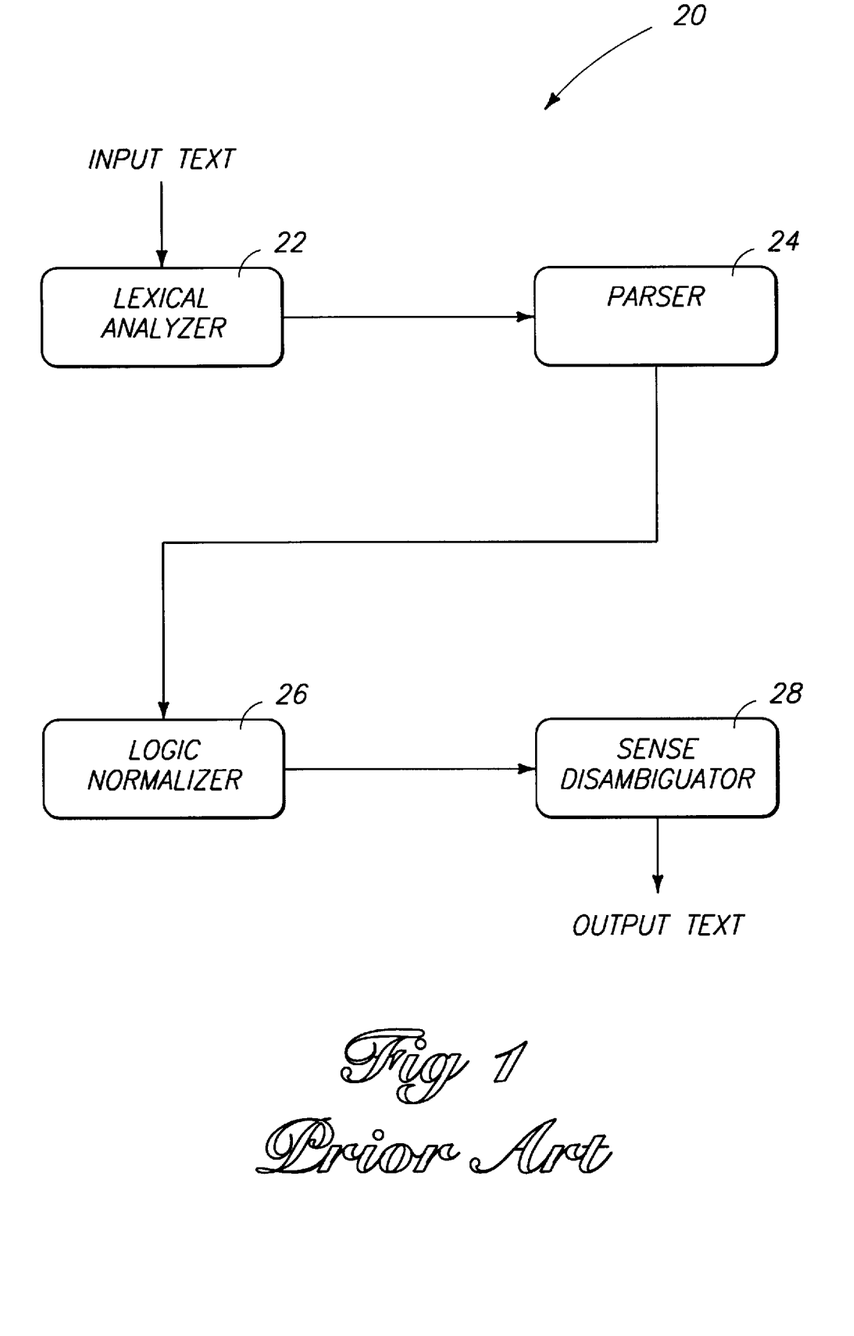
FIG. 1 is a block diagram of the functional components in a conventional natural language processing system.

FIG. 1 shows the general components of a natural language processing system 20 which are typically implemented in software and executed on a computer. The natural language processing system 20 includes a lexical analyzer 22 which converts an input text string into a stream of tokens containing information from the lexicon and the system's morphology component. The lexical analyzer 22 determines the possible parts of speech, person, number and other grammatical features for each token (word). In this example, suppose the input string is the phrase "school finishes." The lexical analyzer 22 might resolve the word school as follows:

Word: school
Part of Speech:
  Noun
    Features: third person, singular
  Verb
    Features: plural, infinitive, present tense
  Adjective
    Features: pre-modifies noun.

The lexical analyzer 22 uses the components to construct data structures, commonly referred to as lexical records, for each word in the input string text. A parser creates a syntactic analysis for the input string by using the lexical records produced by the lexical analyzer 22, combining lexical records into constituents to form larger constituents until one or more complete trees are produced. The product of the parser 24 is passed to a logic normalizer 26 which places linguistically equivalent sentences (e.g., "John ate an apple" is essentially equivalent to "an apple was eaten by John") in a normalized form. Finally, a sense disambiguator 28 resolves any ambiguities that might be left in the sentence following the parse, syntax, and logic processes. For instance, the sense disambiguator 28 might handle whether the word school is a building or an activity that finishes.

This invention particularly concerns problems associated with natural language parsers. Conventional natural language parsers are typically one of two types: "statistical" and "rule-based." A statistical parser, which are currently more popular, determines parsing parameters by computing statistics on words used in a small sample portion of a corpus. Once the statistics are computed, the statistical parser relies on them when analyzing the large corpus. This is described below in more detail.

A rule-based parser stores knowledge about the structure of language in the form of linguistic rules. The parser makes use of syntactic and morphological information about individual words found in the dictionary or "lexicon" or derived through morphological processing (organized in the lexical analysis stage). Successful parsing requires that the parser (grammar) have the necessary rules and the lexical analyzer provide all the details needed by the parser to resolve as many ambiguities as it can at that level.

Natural language parsers are said to have "broad coverage" when capable of parsing general natural language text of many different types. To achieve broad coverage, a natural language parser needs a complete lexicon which includes frequent and seldom-used words. Even the most rare parts of speech should be represented when attempting broad-coverage.

Broad coverage, rule-based natural language parsers have a disadvantage in that they require extensive amounts of dictionary data and rule-writing labor by high skilled linguists to create, enhance, and maintain the parsers. Manually coding the required information is both time-consuming and error-prone. A standard on-line dictionary represents centuries of hand-coding by skilled lexicographers.

Machine-readable dictionaries (MRDs) are being adapted for use in natural language parsers. MRDs provide a large and complete lexicon needed for broad coverage. Though dictionaries prove useful as sources of comprehensive lexicons for natural language parsers, their completeness introduces ambiguity that is not easily resolved. Resolving ambiguity with regard to parts of speech presents a particularly difficult problem. The American Heritage Dictionary (1992 edition) has approximately 18,500 words with multiple parts of speech, which represents approximately 12% of the total number of entries (inflected forms included). However, these words are often common, well used words. One researcher studied the Brown Corpus (a well known, large, one million word body composed of natural language text from many different subjects) and found that only 11% of each unique word in the Corpus were part-of-speech ambiguous. However, those same words accounted for 48% of the raw text in the Brown Corpus, evidencing that words which are part-of-speech ambiguous tend to be common, well used words. DeRose, S. J. 1992. "Probability and Grammatical Category: Collocational Analyses of English and Greek." In *For Henry Kučera*, eds. A. W. Mackie, T. K. McAuley and C. Simmons, 125–152. Michigan Slavic Publications, University of Michigan.

It is computationally desirable that the parser be able to choose the most probable parse from the potentially large number of possible parses. Further processing of the input quickly becomes complex and inefficient if more than one parse is considered. To reduce the number of possible parsers, it is desirable to develop methods which assist the parser in efficient resolution of part-of-speech ambiguities.

One prior art parsing technique is to use an augmented transition network (ATN). An ATN is similar to a recursive transition network in that it is a directed us graph with labeled states and arcs, except that the ATN permits the addition of conditions to be satisfied and structure building actions to be executed to an arc. ATNs often generate multiple and unlikely parses because they cannot successfully resolve part-of-speech ambiguities. Church, K. W. 1992. "Current Practice in Part of Speech Tagging and Suggestions for the Future." In *For Henry Kučera,* eds. A. W. Mackie, T. K. McAuley and C. Simmons, 13–48. Michigan Slavic Publications, University of Michigan. This is most likely true for all broad-coverage rule-based approaches. To accomplish broad-coverage, a parser must be able to analyze the variety of structures found in real text. When there are multiple words which are ambiguous with respect to their part of speech in a single sentence, determining the most probable parse becomes a difficult undertaking. This problem becomes extreme when truly broad-coverage parsing is attempted.

Another prior art technique that has evolved over the last 25 years is to employ statistical models for part-of-speech determination. The statistical models are implemented using statistical parsers. With the statistical approach, a statistical parser is initially operated in a training mode in which it receives input strings that have been annotated by a linguist with tags that specify parts of speech, and other characteristics. The statistical parser records statistics reflecting the application of the tags to portions of the input string. After a significant amount of training using tagged input strings, the statistical parser enters a parsing mode in which it receives raw untagged input strings. In the parsing mode, the statistical parser applies the learned statistics assembled during the training mode to build parse trees for the untagged input string.

Early versions of the statistical parser required a large rule database and a large training corpus to provide adequate statistics for later use in determining parts of speech. Great strides have been made since then in terms of the efficiency, simplicity, and accuracy of tagging algorithms and in the reduction of the rule database. While the size of the rule database is shrinking, the need for large training corpora remains. Statistical approaches usually require a training corpus that has been manually tagged with part-of-speech information.

In an effort to avoid use of large training corpora, a developer proposed use of a rule-based parser to derive part-of-speech and rule probabilities from untagged corpora. By incorporating part-of-speech and rule probabilities into the same parser, the speed and accuracy of the parser was improved. This approach is described in a publication Richardson, S. D. 1994, "Bootstrapping Statistical Processing into a Rule-based Natural Language Parser," *In Proceedings of the ACL Workshop "Combining symbolic and statistical approaches to language",* pp. 96–103. It is also the subject of U.S. patent application Ser. No. 08/265,845, filed Jun. 24, 1994, and a PCT Application No. PCT/US95/08245, filed Jun. 26, 1995, which are entitled "Method and System for Bootstrapping Statistical Processing into a Rule-based Natural Language Parser."

The statistical rule-based parser assumes, however, the availability of a large corpus and a fairly comprehensive parser. In the English language, large well-balanced corpora like the Brown Corpus (Kučera and Francis, 1967) and the Lancaster-Oslo/Bergen (LOB) Corpus (Johansson et al,. 1978) are suitable. Unfortunately, such corpora are not always available in other languages.

Accordingly, the inventor has developed an improved technique for deriving part-of-speech probabilities without reliance on large well-balanced training corpora.

SUMMARY OF THE INVENTION

This invention concerns a natural language parser and methods for determining part-of-speech probabilities by using a dictionary or other lexicon as a source for the part-of-speech probabilities. According to one aspect, a method entails examining words in a lexicon (e.g., dictionary), one entry at a time. The number of senses listed for a word and associated with a part of speech is counted. For instance, the word school might have thirteen noun senses and two verb senses. A part-of-speech probability is then derived based on the number of senses counted. The part-of-speech probability provides an indication of the likelihood that the word will be one particular part of speech as opposed to another. Based on the sense counts, the word school has a higher likelihood of being used as a noun in the natural language text, as opposed to a verb, because the noun has thirteen senses in comparison to two senses for a verb.

There are various ways to compute the part-of-speech probabilities. For instance, absolute probabilities can be derived by dividing the number of senses attributable to a part of speech by the total number of senses listed in the dictionary for the word. For the word school, the part-of-speech probability for a noun is 87% (13÷15=0.87) and the part-of-speech probability for a verb is 13% (2÷15=0.13). Relative probabilities can also be determined based on the relative sense counts for different parts of speech. For instance, the word school has a ratio of 13:2 for noun to verb, indicating that the word school is more likely to be a noun than a verb. Other mathematical relationships can also be used.

Determining sense counts and part-of-speech probabilities is preferably accomplished using a computer-implemented automated process. A computer is programmed to read a machine-readable dictionary, one entry at a time. If the dictionary contains words that are primarily listed in their lexeme or root form, the computer can optionally generate inflected forms of the words and create additional entries in the dictionary to thereby expand the original lexicon. An "inflected" form of a word is one that is changed from the root form to mark distinction of case, gender, number, tense, person, mood, voice, or comparison. For each entry (lexeme or inflected form), the computer counts the senses listed. If the word is an inflected form, the computer adds the number of senses listed for the inflected form entry and the number of senses listed for the lexeme entry. The computer then computes the part-of-speech probabilities from the sense counts.

In one implementation, the part-of-speech probabilities are permanently stored on the machine-readable dictionary in correlation with the words. In this manner, the probabilities can be retrieved from memory for each word, as opposed to re-computing the probabilities each time. Alternatively, the part-of-speech probabilities can be computed on the fly as the words are used and referenced in the dictionary.

When the parser begins to parse a sentence within an input text, for each token (word) of that input text, the part of speech with the highest probability is initially loaded into the parser. The parser uses this most probable part of speech when attempting to construct its first parse. If it successfully creates a well-formed parse, it does not need to try other parts of speech or attempt construction of other parses. The first successful parse is usually the most probable parse with this approach. As a result, the parser's accuracy improves and fewer multiple parses are generated. Because the probabilities are derived without requiring a mature parser (i.e., one that has learned from a text for some time) or manually tagged corpora, they can be used at the early stages of development of a parser, aiding the grammar rule writer as she/he develops a parser.

DETAILED DESCRIPTION OF THE PREFERRED EMBODIMENT

Figure 2:
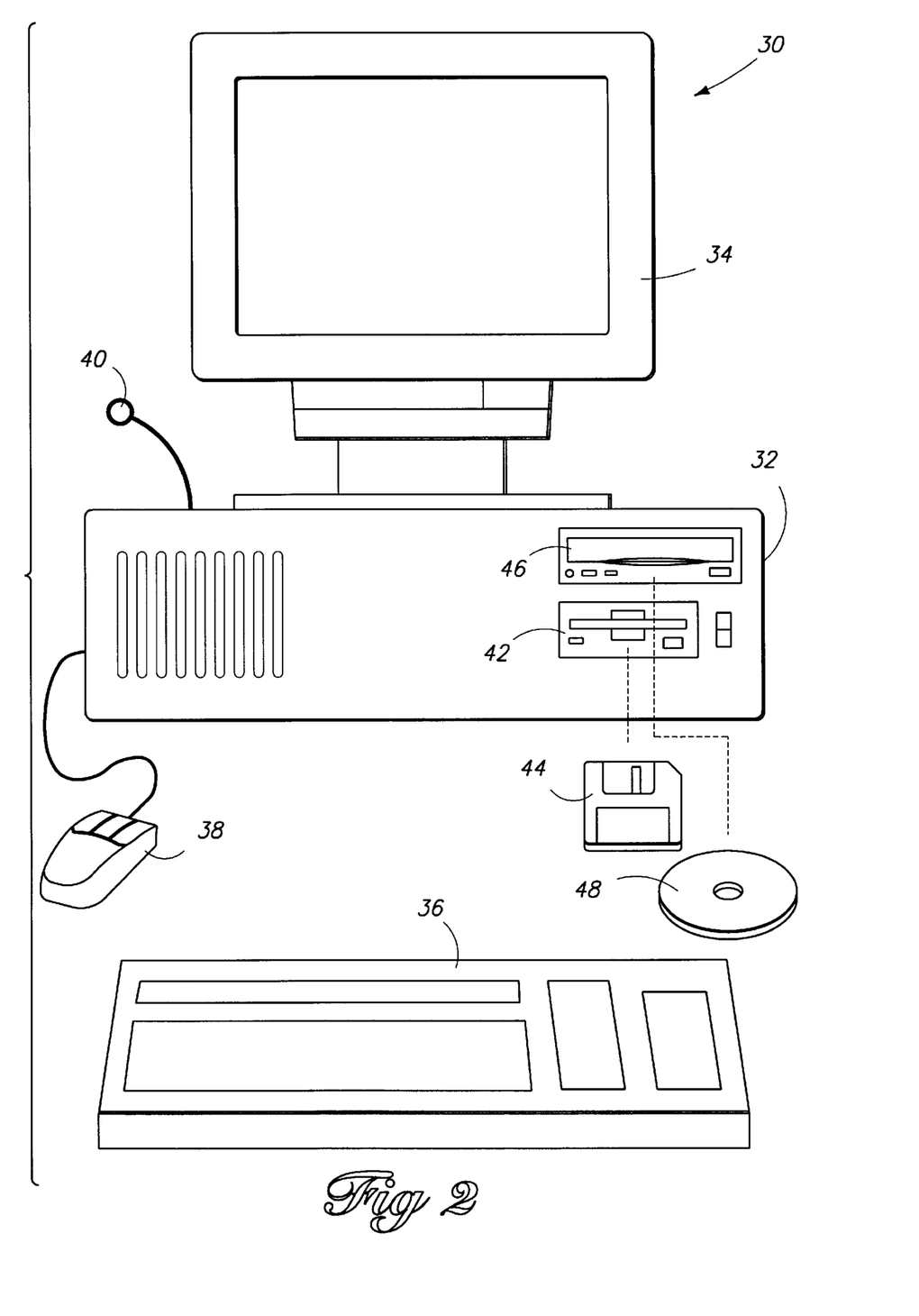
FIG. 2 is a diagrammatic illustration of a computer having a natural language processing system implemented thereon.

FIG. 2 shows a computer 30 in the form of a conventional desktop IBM-compatible computer. The computer 30 has a central processing unit (CPU) 32, a display monitor 34, a keyboard 36, a mouse 38, and a voice or audio input microphone 40. The computer 30 might also include other input devices in addition to, or in lieu of, the keyboard 36, mouse 38, and voice input 40, including such devices as a track ball, stylus, or the like.

The computer 30 also has a floppy disk drive 42 for interfacing with a compatible floppy memory diskette 44 (e.g., 3.5" form factor), and an optical disk drive 46 for interfacing with a compatible CD-ROM 48. In the described implementation, the storage devices can be used to store a comprehensive machine-readable dictionary, such as an electronic version of the American Heritage Dictionary. In the example used herein, the electronic version of the American Heritage Dictionary is derived from the publishers tape and converted to a structure that is used in the natural language system. The diskette and CD-ROM are shown for discussion proposes, and other forms of memory may be used.

Figure 3:
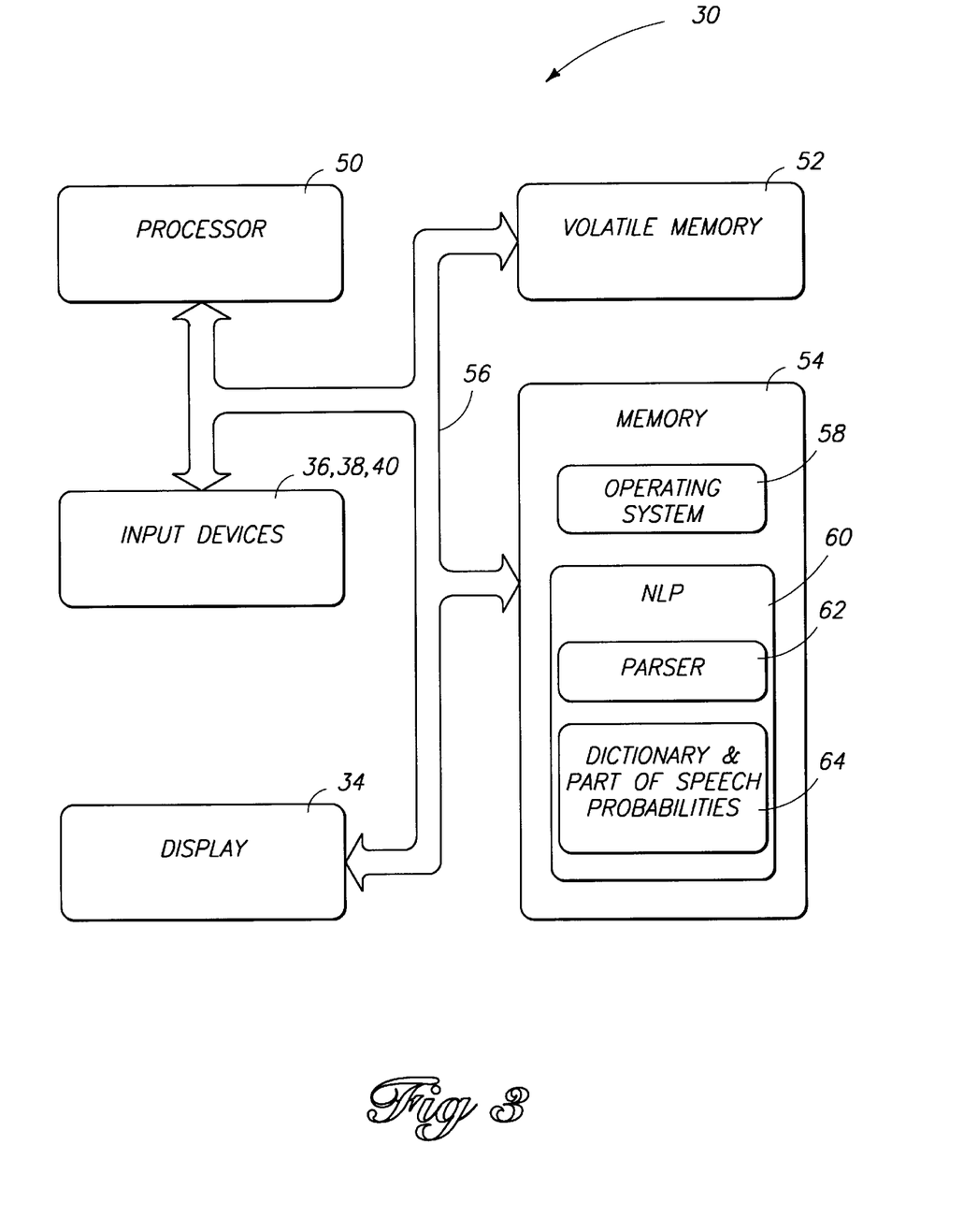
FIG. 3 is a block diagram of the computer and natural language processing system.

FIG. 3 shows a functional block diagram of the computer 30. The computer 30 has a processor 50, a volatile memory 52 (e.g., RAM), and a non-volatile memory 54 interconnected by an internal bus 56. The non-volatile memory 54 is representative of many different forms of memory, including integrated circuit chips (e.g., ROM, EEPROM), one or more disk drive(s) (e.g., floppy, optical, hard), or a combination of these memory types. The display 34 is connected to the bus 56 through appropriate hardware interface drivers (not shown). Additionally, the input devices (keyboard 36, mouse 38, and voice microphone 40) are connected to supply data to the bus 56 via appropriate I/O ports, such as serial RS232 ports.

The computer 10 runs an operating system 58 which supports multiple applications. The operating system 58 is stored on the non-volatile memory 54 (e.g., the computer hard disk drive) and executes on the processor 50. The operating system is preferably a multitasking operating system which allows simultaneous execution of multiple applications, although aspects of this invention may be implemented using a single-tasking operating system. The operating system employs a graphical user interface windowing environment which presents the applications or documents in specially delineated areas of the display screen called "windows." Each window has its own adjustable boundaries which enable the user to enlarge or shrink the application or document relative to the display screen. Each window can act independently, including its own menu, toolbar, pointers, and other controls, as if it were a virtual display device. One preferred operating system is a Windows® brand operating system sold by Microsoft Corporation, such as Windows® 95 or Windows NT™ or other derivative versions of Windows®. However, other operating systems which provide windowing environments may be employed, such as the Macintosh OS from Apple Corporation and the OS/2 Presentation Manager from IBM.

A natural language processing (NLP) system 60 is stored in the non-volatile memory 54. The NLP system 60 includes a parser 62 and a comprehensive, broad-coverage lexicon or dictionary 64. In the described implementation, the parser is a broad-coverage, rule-based, natural language parser which is implemented in software, stored on the memory 54 (e.g., the hard disk or CD-ROM), and executed on the processor 50.

It is noted that the invention is described within the illustrated context of a familiar desktop computer, as shown in FIG. 2. An example computer includes a 386-equivalent, or better, microprocessor with four or more megabytes of RAM. However, aspects of this invention might also be employed in other forms of computing devices, including laptops, hand held computer, and dedicated computer apparatuses which are configured primarily for natural language processing.

This invention primarily concerns the parser component of the NLP system 60. One preferred parser for use in conjunction with this invention is a rule-based natural language parser described in U.S. patent application Ser. No. 08/265,845, filed Jun. 24, 1994 in the names of Richardson et al., and a PCT Application No. PCT/US95/08245, filed Jun. 26, 1995, which are entitled "Method and System for Bootstrapping Statistical Processing into a Rule-based Natural Language Parser." These applications are assigned to Microsoft Corporation, and are hereby incorporated by reference.

According to an aspect of this invention, the parser described in the above cited applications is modified to employ a comprehensive dictionary as a source of part-of-speech data. More particularly, the parser uses the number of senses listed in the dictionary for individual words as a basis for deriving part-of-speech probabilities that are used to determine which part of speech a word is likely to be within a natural language text.

Figure 4:
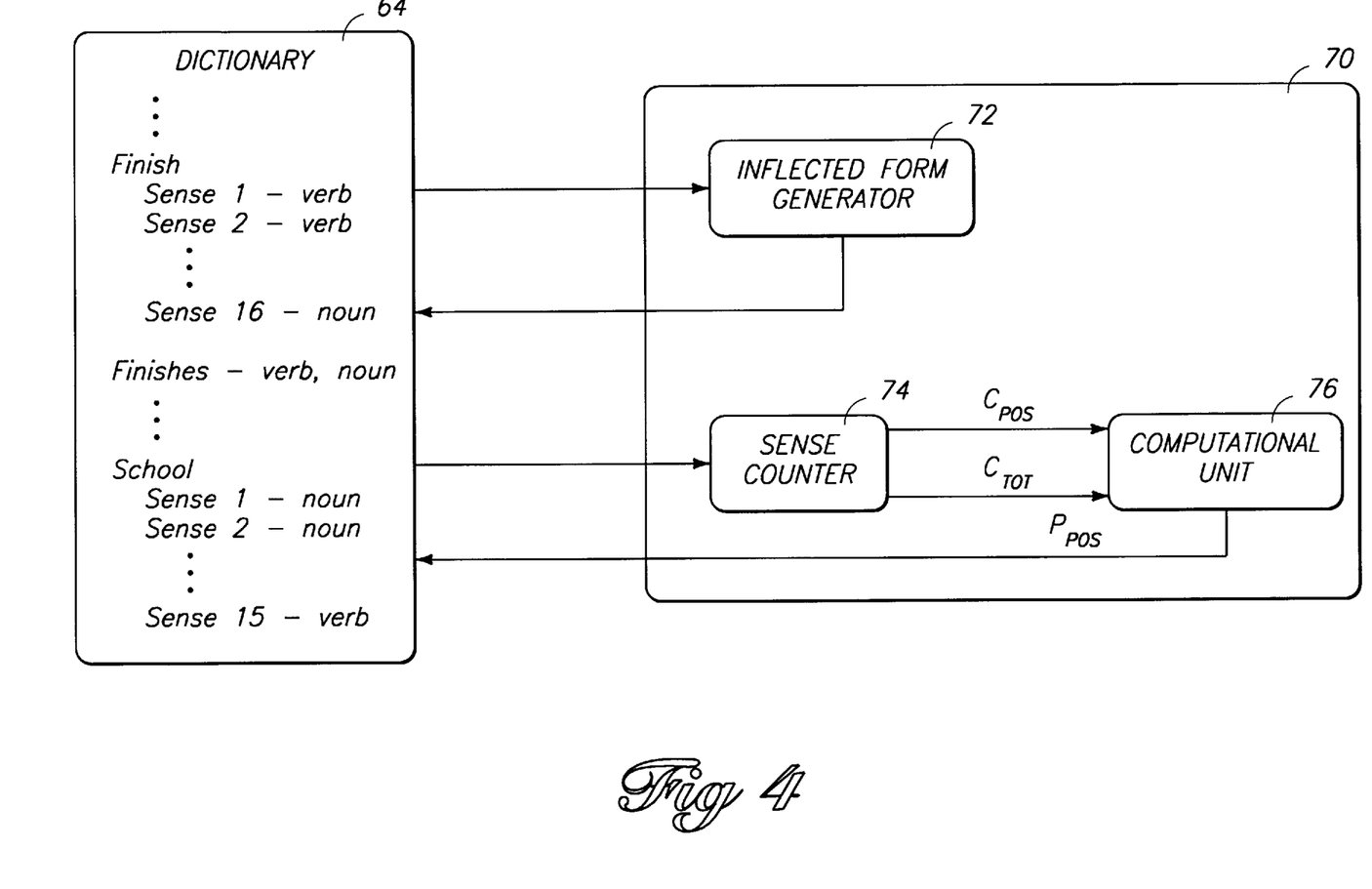
FIG. 4 is a block diagram of a computer-implemented apparatus for determining part-of-speech probabilities from a computer-readable dictionary.
Figure 5:
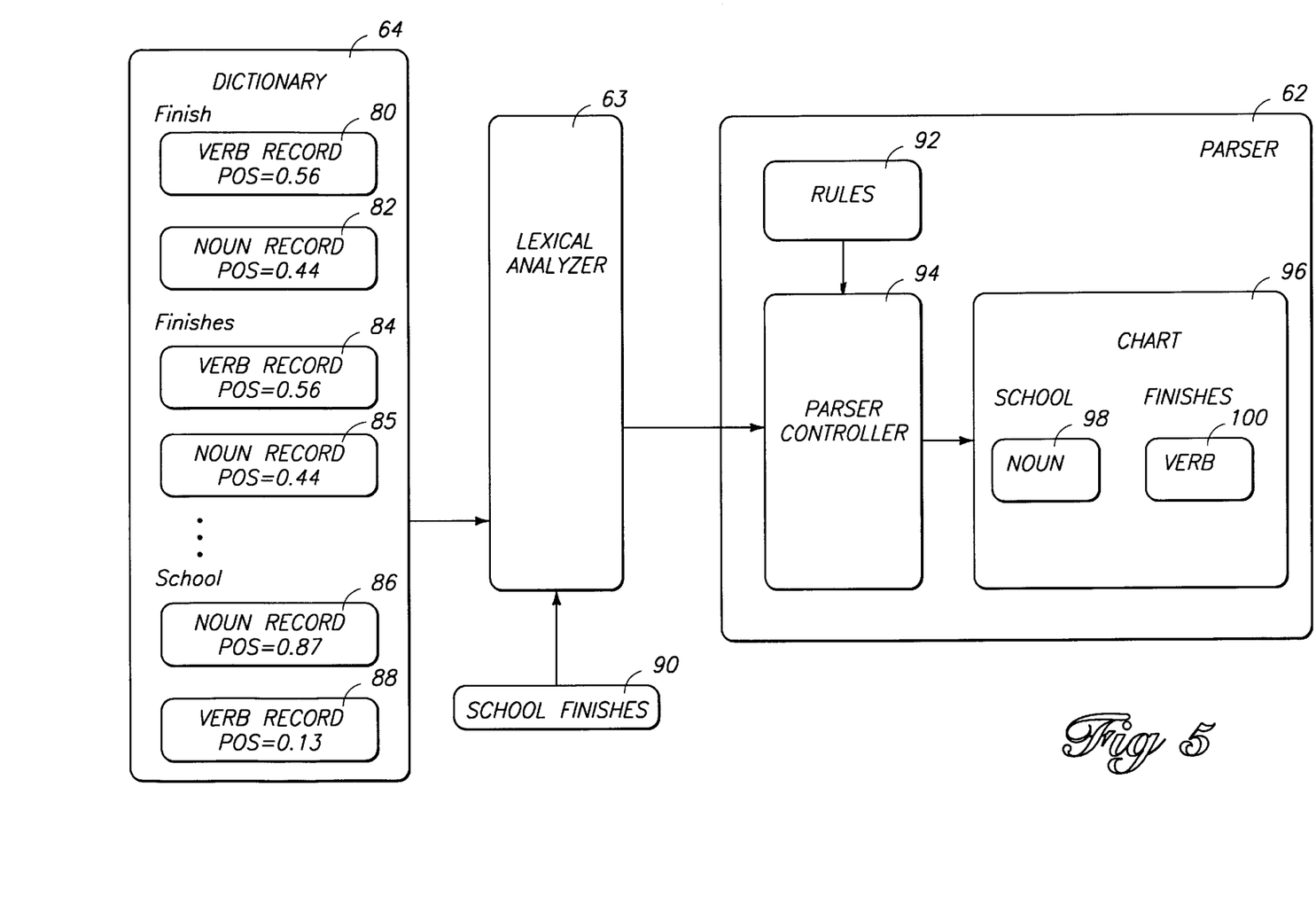
FIG. 5 is a block diagram of a computer-implemented parser for parsing a natural language text according to an aspect of this invention.

One implementation of the invention will now be described with reference to FIGS. 4-6. FIGS. 4 and 5 illustrate functional components, whose operation is described with reference to the steps of the flow diagram in FIG. 6.

FIG. 4 shows a computer-implemented processing apparatus 70 for determining part-of-speech probabilities using a machine-readable dictionary 64. The processing apparatus 70 can be implemented independently of the NLP system 60, whereby the part-of-speech probabilities are pre-determined and stored with the dictionary for future use by the NLP system. Alternatively, the apparatus 70 can be incorporated into the NLP system 60 (e.g., implemented as part of the parser). This latter implementation allows flexibility for the NLP system 60 to pre-compute part-of-speech probabilities for many dictionary entries, or to calculate them on the fly as it references each word in the dictionary.

The comprehensive dictionary 64 has numerous dictionary entries for corresponding words. One or more senses are listed after each word entry. The sense(s) reflect one or more parts of speech. As an example, the American Heritage Dictionary classifies words into eight parts of speech: noun, verb, adjective, adverb, pronoun, preposition, conjunction and interjection. The majority of words have only one part of speech, leaving a minority of words having two or more parts of speech. The American Heritage Dictionary (1992 edition) has approximately 18,500 words with multiple parts of speech, which represents approximately 12% of the total number of entries (inflected forms included).

Originally, the dictionary 64 might contain words which are substantially in their root or "lexeme" forms, as opposed to their "inflected" forms. An "inflected" form of a word is one that is changed from the root form to mark distinction of case, gender, number, tense, person, mood, voice, or comparison. The following table lists two examples of lexeme and inflected forms of words.

| Lexeme | Inflected Forms |
| --- | --- |
| School | Schools, Schooled, Schooling |
| Finish | Finishes, Finished, Finishing |

Figure 6:
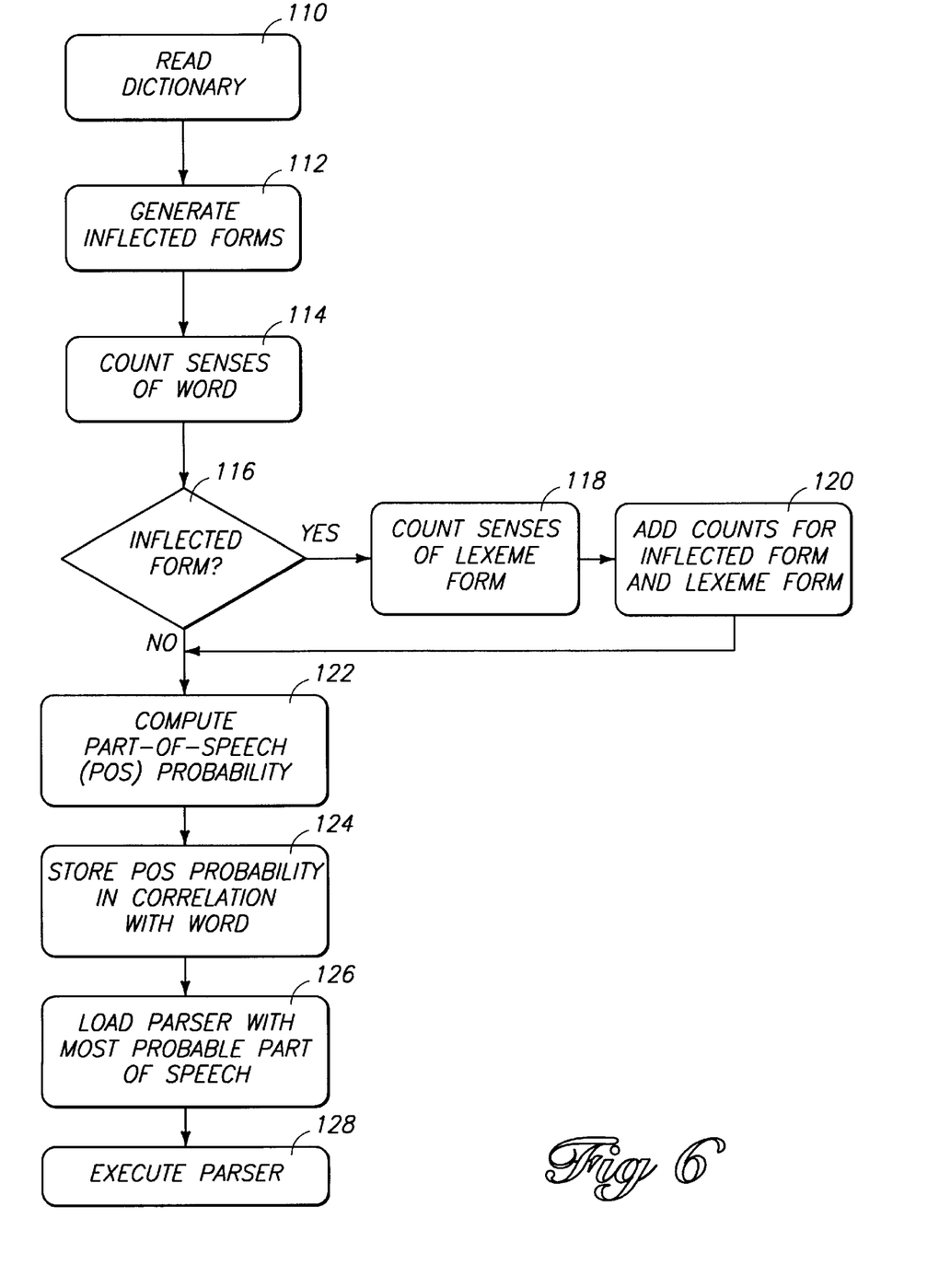
FIG. 6 is a flow diagram of steps in a method for parsing a natural language text.

The processing unit 70 reads the dictionary, one entry at a time (step 110 in FIG. 6). If the dictionary does not have an entry for an inflected form of a word, the processing unit 70 creates one. More particularly, the processing unit 70 has an inflected form generator 72 which receives a lexeme form of a word and generates the inflected forms (step 112 in FIG. 6). Inflected forms are determined automatically by rule-based generation of inflectional paradigms and information provided by the dictionary 64. Inflected forms are treated as lexicalized entries for the initial computation. In the illustrated example, the lexeme form of finish and other information from the dictionary 64 are passed to the inflected form generator 72, which generates word records for inflected forms finishes, finished, and finishing. These word records for the inflected forms are stored in the dictionary to produce an expanded version of the dictionary that accounts for both lexeme and inflected forms of words.

During the same or a subsequent pass through the dictionary, the processing unit 70 determines part-of-speech probabilities for each entry. The processing unit 70 has a sense counter 74 which counts the number of senses listed for the dictionary entry and associated with a part of speech (step 114 in FIG. 6). The sense counter 74 produces a part-of-speech (POS) count $C_{POS}$ for each of the part-of-speech possibilities. The word school has thirteen noun senses listed in the American Heritage Dictionary and two verb senses. Accordingly, the sense counter 74 produces a noun count $C_{NOUN}=13$ and a verb count $C_{VERB}=2$. The sense counter 74 might also tally a total count $C_{TOT}$, which in this example is $C_{TOT}=15$.

If the dictionary entry is an inflected form of a word (i.e., the "yes" branch from step 116 in FIG. 6), the sense counter 74 additionally counts the sense listed for the lexeme form of the word (step 118 in FIG. 6). The counts for the lexeme and inflected forms are then combined to produce the part-of-speech count $C_{POS}$ (step 120 in FIG. 6). For example, the word fell is a dictionary entry (a lexeme in its own right, i.e., he felled the trees) and an inflected form of the word fall (past tense of fall). The dictionary entry/lexeme entry for the word fell, has two verb senses, six noun senses, and four adjective senses. The lexeme fall has twenty-four verb senses. Because fell is both a lexeme and an infected form of fall, the sense counter 74 adds the two verb senses from the dictionary entry/lexeme entry for fell to the twenty-four verb sense listed for the lexeme form fall to produce a verb count $C_{VERB}=26$.

Entries with inflected forms that are created by the inflected form generator 72 may not have any senses listed in relation to the entry, but only an indication of the part of speech. As an example, the entry for the inflected word finishes contains information identifying the word as a verb and a noun. The lexeme form of the word finish has nine verb senses and seven noun senses. When considering the word finishes, the sense counter will add the number of verb senses for the inflected form entry, which are zero in this case, to the number of verb senses for the lexeme entry, which is nine. The sense counter 74 will also add the number of noun senses for the inflected form entry, which is zero in this case, to the number of noun senses for the lexeme entry, which is seven. This yields a verb count $C_{VERB}=9$ and a noun count of $C_{NOUN}=7$.

Another way to view this approach is that the number of senses for the appropriate part of speech in the root form are assigned to the dictionary entry for the inflected form. The word cats, for example, can be both a plural noun and a present tense, third-person, singular verb. The sense counts from both the noun and verb senses of cat are thereby assigned to the dictionary entry for cats. As a result, there are twelve noun senses and two verb senses for the word cats. The inflected form catting, on the other hand, is used only as a verb, and hence only the two verb senses of cat are assigned to the dictionary entry for catting.

For some words, it might be useful for the sense counter to tune the sense counts to provide a better spread between them. That is, words that have approximately even distribution of part-of-speech senses might be manipulated to spread the distribution, while words that predominantly favor one part-of-speech over another can be left alone. The word finish, for example, has a fairly even distribution with nine verb counts and seven noun counts. These values can be manipulated by increasing the highest number and decreasing the smallest number to thereby increase the difference between them. Through this manipulation, the parser will be more willing to remain with the most probable part of speech for a longer period of time because it appears substantially more likely.

The processing unit 70 has a computational unit 76 which receives the part-of-speech counts $C_{POS}$ and total count $C_{TOT}$ from the sense counter 74. The computational unit 76 computes, for each word, one or more part-of-speech probabilities indicative of how likely the word is to be particular parts of speech (step 122 in FIG. 6). If the word has only one part of speech, the part-of-speech probability is easily computed to be 100%, indicating that the word will always be used as that part of speech. For words with multiple parts of speech, however, the computational unit 76 produces a part-of-speech probability $P_{POS}$ for each part of speech.

The computational unit 76 can be configured to compute different probabilistic measures. For instance, the computational unit can derive an absolute probability for each part of speech according to a function of the sense count $C_{POS}$ and the total sense count $C_{TOT}$. More particularly, the part-of-speech probability $P_{POS}$ is defined as follows:

$$P_{POS}=C_{POS}\div C_{TOT}.$$

For the word school, the computational unit 76 derives a part-of-speech probability for a noun that is equal to thirteen noun senses divided by fifteen total senses, or 87% (i.e., 0.87=13÷15). The part-of-speech probability for a verb is equal to two verb senses divided by fifteen total senses, or 13% (0.13=2÷15).

The computational unit 76 might also compute relative probabilities based upon the relative sense counts for different parts of speech. For instance, the word school has a ratio of 13:2 for noun to verb, indicating that the word school has a higher likelihood of being a noun in the text as compared to being a verb. Determining relative probabilities has an advantage in that it eliminates the need for a total sense count $C_{TOT}$.

Even more simply, the raw counts can be used as pseudo part-of-speech probabilities. The part of speech with the highest sense count is considered to be the most probable part of speech for the associated word. The computational unit 76 can be configured to compare the various part-of-speech counts for different parts of speech and indicate which part of speech has the highest count. Alternatively, the processing unit 70 can store the raw counts for each part of speech as output by the sense counter 74, bypassing the computational unit 76 altogether. In the most reduced state, the processing unit 70 can store a single indicia in the dictionary which represents the part-of-speech with the highest count.

The processing unit 70 proceeds through all of the dictionary entries. The computed part-of-speech probabilities are stored in the dictionary 64 in correlation to the words, or in a separate data record (step 124 in FIG. 6). These part-of-speech probabilities are then used to help select initial parts of speech to be employed in a natural language parser when parsing a text.

FIG. 5 shows a rule-based natural language parser 62 that uses the dictionary 64 as its source of part-of-speech data. The parser 62 and dictionary 63 are interfaced through a lexical analyzer 63. The dictionary 64 is essentially the same as described above with respect to FIG. 4, but is described as being organized into records which can be easily passed to the parser 62. Alternatively, another lexicon derived from the dictionary 64 can be employed. Each dictionary entry specifies one or more part-of-speech records for a corresponding word, as represented by records 80–88. The part-of-speech records include other information in addition to part of speech, such as person, number, and tense. There is one record per part of speech for a given word. As an example, the dictionary 64 contains the word school which has a noun record 86 and a verb record 88 to cover the two different parts of speech.

In the illustrated implementation, the part-of-speech records 80–88 contain the part-of-speech probabilities previously derived by the processing unit, as described above with reference to FIG. 4. In this manner, the part-of-speech probabilities are listed in correlation with the associated word. For the word school, the noun record 86 contains a noun probability of 87% and the verb record 88 contains a verb probability of 13%.

An input text string 90 is fed via the lexical analyzer 63 to the parser 62. In the illustrated example, the input text 90 consists of a two word statement, "School finishes." The parser 62 operates to parse this input string. The parser 62 contains a set of augmented phrase structure grammar rules 92. The parser 62 further contains a parser controller 94 which applies lexical records (i.e, entries created by the lexical analyzer by getting information from the dictionary and morphological analysis) and rules to produce new records in a working area or chart 96. The dictionary may not have every word found in the text. For instance, the word finishes is not in the regular dictionary, although it is in the probability file of the expanded dictionary 64. The lexical analyzer 63 creates a record that includes the probability information and morphological information (i.e., identifying finishes as a plural noun and a singular verb). The records in the chart 96 are then used for assembling a syntax tree for the input string, in order to eventually produce one or more sentence records in the chart.)

At the beginning of a parse of input string 90, the chart 96 contains no records. The parser controller 94 begins by selecting one or more lexical records corresponding to words in the input string 90 according to the rules 92 and creates a record in the chart 96. The parser controller 94 chooses a part-of-speech record based upon its corresponding part-of-speech probability, and preferably, a part-of-speech record representing the most probable part-of-speech (step 126 in FIG. 6). For the input text School finishes, the parser controller 94 selects the noun record 86 for the word school because it has the highest part-of-speech probability (0.87 for noun as opposed to 0.13 for verb). This part-of-speech probability indicates that the word school is more likely to be used as a noun than as a verb. Hence, initially trying the word school as a noun is a good starting point for the parser. The noun record 86 is copied into the chart 96 as represented by entry 98. In the same way, the parser controller 94 is directed by the lexicon rules 92 to include a verb chart entry 100 for the word finishes that contains the verb record 84 from the dictionary 64.

In one implementation, an ordered queue is used to store all part-of-speech records for all words in the input string 90. For the input text School finishes, for example, the noun and verb records 86, 88 for the word school are loaded into the queue, along with the noun and verb records 84, 85 for the word finishes. For each word in the input string, the part-of-speech record considered most probable is placed at the top of the queue. Accordingly, the school noun record 86 and the finishes verb record are placed atop the school verb record 88 and the finishes noun record 85 in the queue. This assures that for each word in the input text, the most probable part-of-speech record is made available to the parser initially. The rest of the queue contains both rule and part-of-speech records sorted with decreasing order of relative part-of-speech probabilities, from highest to lowest.

Once initialized, the parser 62 begins parsing the text based upon lexicon rules 92 (step 128 in FIG. 6). As the part-of-speech record is entered into the chart 96, all applicable rules (based on examination of constituent sequences) are also placed in the same or different queue. The set of augmented phrase structure grammar rules used by the chart parser are optimized to produce just one parse for each sentence, although multiple parses and fitted parses are also possible. Rules are applied using the part-of-speech records entered into the chart 96. If necessary, subsequent part-of-speech records are entered into the chart 96 in the order they are found in the queue. When a parse tree for the entire input string is found, the process ends.

A more detailed explanation of a suitable rule-based parsing technique is described in the previously referenced Richardson et al. U.S. patent application Ser. No. 08/265,845 and PCT Application No. PCT/US95/08245, which are incorporated herein by reference.

The parser and methods described above have several advantages. By calculating the number of senses per part of speech in a comprehensive machine-readable dictionary to determine the most probable part of speech and then supplying that information to the rule-based parser, parses improve and fewer multiple parses are generated. Moreover, this way of calculating part-of-speech probabilities is achieved without use of a mature parser or tagged corpora. Another benefit is that the source of the part-of-speech probabilities, a machine-readable dictionary, is an extremely useful tool that can be further used for all other levels of the natural language process.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. In a parser of a natural language processing system, a method comprising the following steps:
    examining individual dictionary entries for corresponding words in a dictionary;
    counting, for an individual dictionary entry, a number of senses listed in the dictionary entry which are associated with a part of speech; and
    deriving a part-of-speech probability indicative of how likely a dictionary entry is to be a particular part of speech based upon the number of senses associated with the particular part of speech.

2. A method as recited in claim 1, wherein the examining step comprises the step of reading a computer-readable dictionary using a computational device.

3. A method as recited in claim 1, further comprising the following steps:
    counting a total number of senses for the dictionary entry; and
    computing the part-of-speech probability as a function of the number of senses counted for the part of speech and the total number of senses.

4. A method as recited in claim 1, further comprising the following steps:
    counting a number of senses listed in the dictionary entry which are associated with every part of speech; and
    determining which part of speech is most probable based upon the various numbers of senses associated with the different parts of speech.

5. A method as recited in claim 4, further comprising the step of entering the most probable part of speech into the parser.

6. A method as recited in claim 1, further comprising the following steps:
    determining whether the dictionary entry is an inflected form of a lexeme accounted for by another dictionary entry;
    in an event that the dictionary entry is an inflected form, counting a number of senses for each part of speech attributable to the lexeme dictionary entry and a number of senses for each part of speech attributable to the inflected form dictionary entry; and
    adding the number of senses attributable to the lexeme dictionary entry and the inflected form dictionary entry to derive the part-of-speech probability for the inflected form dictionary entry.

7. A method as recited in claim 1, further comprising the following steps:
    counting a number of senses listed in the dictionary entry which are associated with every part of speech; and
    deriving part-of-speech probabilities for all of the parts of speech based upon the number of senses associated with the parts of speech.

8. A method as recited in claim 1, wherein the dictionary entry has first and second parts of speech, further comprising the following steps:
    counting a first number of senses for the first part of speech and a second number of senses for the second part of speech;
    modifying at least one of the first and second numbers to increase a difference between the first and second numbers; and
    deriving part-of-speech probabilities for the first and second parts of speech based on the modified first and second numbers.

9. A method as recited in claim 1, further comprising the following steps:
    deriving part-of-speech probabilities for many dictionary entries in the dictionary; and
    saving, as part of the dictionary, the part-of-speech probabilities in correlation with the dictionary entries.

10. A computer-readable dictionary stored in a computer-readable memory which incorporates the part-of-speech probabilities created as a result of the method as recited in claim 9.

11. A computer programmed to perform the steps of the method as recited in claim 1.

12. A computer-implemented rule-based parser stored in a storage medium and executable on a process programmed to perform the steps of the method as recited in claim 1.

13. A computer-readable memory which directs a computer to perform the steps of the method as recited in claim 1.

14. In a natural language processing system for determining which part of speech a word is likely to be in a natural language text, the word being listed in a dictionary with multiple senses attributed thereto, the senses reflecting multiple different parts of speech that the word can assume in different contexts, a method comprising the following steps:
    counting a number of senses listed in the dictionary for each part of speech that the word can assume; and
    deriving a part-of-speech probability indicative of how likely the word is to be a particular part of speech based upon the number of senses counted in conjunction with the particular part of speech.

15. A method as recited in claim 14, further comprising the following steps:
    counting a total number of senses listed in the dictionary; and
    computing the part-of-speech probability as a function of the number of senses counted for the particular part of speech and the total number of senses.

16. A method as recited in claim 14, further comprising the following steps:
    deriving a part-of-speech probability for each part of speech that the word can assume; and
    determining which of the parts of speech is most probable from the part-of-speech probabilities.

17. A method as recited in claim 14, further comprising the following steps:
   deriving part-of-speech probabilities for multiple words in the dictionary; and
   saving, as part of the dictionary, the part-of-speech probabilities in correlation with the words.

18. A computer-readable dictionary stored in a computer-readable memory which incorporates the part-of-speech probabilities created as a result of the method as recited in claim 17.

19. A computer programmed to perform the steps of the method as recited in claim 14.

20. A computer-implemented rule-based parser stored in a storage medium and executable on a process programmed to perform the steps of the method as recited in claim 14.

21. A computer-readable memory which directs a computer to perform the steps of the method as recited in claim 14.

22. In a natural language processing system for determining which part of speech a word is likely to be in a natural language text, the word being listed in a dictionary with multiple senses attributed thereto, the senses reflecting multiple different parts of speech that the word can assume in different contexts, a method comprising the following steps:
   counting a number of senses listed in the dictionary for each part of speech that the word can assume; and
   using the number of senses counted for each part of speech as an indication of how likely the word is to be a particular part of speech.

23. A method as recite in claim 22, further comprising the step of initializing the parser to parse beginning with the part of speech having a highest number of senses.

24. A computer programmed to perform the steps of the method as recited in claim 22.

25. A computer-implemented rule-based parser stored in a storage medium and executable on a process programmed to perform the steps of the method as recited in claim 22.

26. A computer-readable memory which directs a computer to perform the steps of the method as recited in claim 22.

27. In a natural language processing system, a method comprising the following steps:
   generating, for lexemes listed as dictionary entries in a dictionary, inflected forms of the lexemes;
   for each lexeme, counting a number of senses for each part of speech attributable to the lexeme in the dictionary;
   for each inflected form, counting a number of senses for each part of speech attributable to the inflected form and adding, for each part of speech, the number of senses attributable to the inflected form and the number of senses attributable to the lexeme from which the inflected form is generated; and
   deriving, for each lexeme and inflected form, a part-of-speech probability indicative of how likely the lexeme or inflected form is to be a particular part of speech based upon the senses counted in said counting steps.

28. A method as recited in claim 27, further comprising the step of reading a computer-readable dictionary using a computational device.

29. A method as recited in claim 27, further comprising the following steps:
   reading a computer-readable dictionary using a computational device, the computer-readable dictionary having dictionary entries that are substantially lexemes; and
   expanding the computer-readable dictionary to include dictionary entries for inflected forms of the lexemes; and
   using the expanded dictionary as a source for counting the senses in said counting steps.

30. A method as recited in claim 27, further comprising the following steps:
   repeating the counting steps for every part of speech attributable to a lexeme or an inflected form;
   deriving multiple part-of-speech probabilities for every part of speech.

31. A method as recited in claim 30, further comprising the following steps:
   determining which part of speech is most probable; and
   entering the most probable part of speech into the parser.

32. A method as recited in claim 30, further comprising the step of saving the multiple part-of-speech probabilities in correlation with the lexeme or inflected form.

33. A computer-readable dictionary stored in a computer-readable memory having the part-of-speech probabilities created as a result of the method as recited in claim 32.

34. A computer programmed to perform the steps of the method as recited in claim 27.

35. A computer-implemented rule-based parser stored in a storage s medium and executable on a process programmed to perform the steps of the method as recited in claim 27.

36. A computer-readable memory which directs a computer to perform the steps of the method as recited in claim 27.

37. A method for parsing a natural language text comprising the following steps:
   counting a number of senses listed in a dictionary that are associated with a part of speech;
   deriving a part-of-speech probability as a function of the number of senses associated with the part of speech; and
   choosing a part of speech for a word in the text based upon the part-of-speech probability.

38. A method as recited in claim 37 further comprising the step of initially choosing, for the word, a part of speech with a highest part-of-speech probability as determined by the part of speech having a highest number of senses listed in the dictionary.

39. A method as recited in claim 37 further comprising the step of sequentially choosing, for the word, parts of speech in decreasing order of part-of-speech probabilities as determined by the number of senses given for each part of speech attributable to the word in the dictionary.

40. A computer programmed to perform the steps of the method as recited in claim 37.

41. A computer-implemented rule-based parser stored in a storage medium and executable on a process programmed to perform the steps of the method as recited in claim 37.

42. A computer-readable memory which directs a computer to perform the steps of the method as recited in claim 37.

43. A method for parsing a natural language text to determine which part of speech a word assumes within the text comprising the following steps:
   counting a number of senses listed in a dictionary which are associated with a part of speech for the word;
   determining the part of speech with a highest number of senses listed in the dictionary; and
   choosing, for an initial parse, the part of speech for the word with the highest number of senses.

44. An apparatus for determining which part of speech a word is likely to be in a natural language text, comprising:
   a sense counter to scan words from a machine-readable dictionary and to count, for each word, a number of senses associated with each part of speech attributable to the word; and a computational unit to compute, for each word, part-of-speech probabilities indicative of how likely the word is to be particular parts of speech based upon the number of senses counted by the sense counter.

45. An apparatus as recited in claim 44, wherein:

the sense counter counts a total number of senses for all parts of speech attributable to the word; and the computational unit computes the part-of-speech probabilities as a function of the number of senses counted for each associated part of speech and the total number of senses.

46. An apparatus as recited in claim 44, wherein:

the machine-readable dictionary contains words in lexeme form and inflected forms of the lexeme form;

in an event that the word is an inflected form, the sense counter counts a number of senses associated with each part of speech attributable to the lexeme form of the word and a number of senses associated with each part of speech attributable to the inflected form of the word; and the computational unit adding the counts from the sense counter for both the lexeme and inflected forms for use in deriving the part-of-speech probabilities for the inflected form of the word.

47. An apparatus as recited in claim 44, wherein:

the word has first and second parts of speech;

the sense counter counts a first number of senses for the first part of speech and a second number of senses for the second part of speech; and the computational unit modifies at least one of the first and second numbers to increase a difference between the first and second numbers and computes the part-of-speech probabilities based on the modified first and second numbers.

48. A computerized rule-based parser processing system comprising the apparatus recited in claim 44.

* * * * *